United States Patent [19]

Kennedy, Jr.

[11] 4,350,596

[45] Sep. 21, 1982

[54] METHOD AND APPARATUS FOR RECOVERING WASTE OIL

[76] Inventor: Alvin B. Kennedy, Jr., P.O. Box 282, Angleton, Tex. 77515

[21] Appl. No.: 266,201

[22] Filed: May 22, 1981

[51] Int. Cl.³ .............................................. B01D 17/04
[52] U.S. Cl. .................................... 210/708; 210/780; 210/787; 210/804; 210/806; 210/178; 210/199; 210/512.2
[58] Field of Search ............... 210/708, 726, 727, 737, 210/748, 774, 780, 785, 787, 799, 804, 806, 177, 178, 182, 199, 202, 297, 388, 389, 512.1, 512.2; 252/328, 331, 332, 358

[56] References Cited

U.S. PATENT DOCUMENTS

| | | | |
|---|---|---|---|
| 2,318,714 | 5/1943 | Robertson | 210/708 |
| 3,289,775 | 12/1966 | Stone | 175/66 |
| 3,756,959 | 9/1973 | Vitalis | 210/708 |
| 4,261,812 | 4/1981 | Newcombe | 210/708 |
| 4,316,805 | 2/1982 | Faust | 210/708 |

Primary Examiner—Ernest G. Therkorn
Attorney, Agent, or Firm—Guy E. Matthews

[57] ABSTRACT

Oil is recovered from a mixture of oil and water by heating the mixture, adding a de-emulsifier, passing the mixture through a first vibrating screen, adding a surface tension reducer, processing through a hydrocyclone, passing through a second vibrating screen, and separating the oil from water by settling.

6 Claims, 1 Drawing Figure

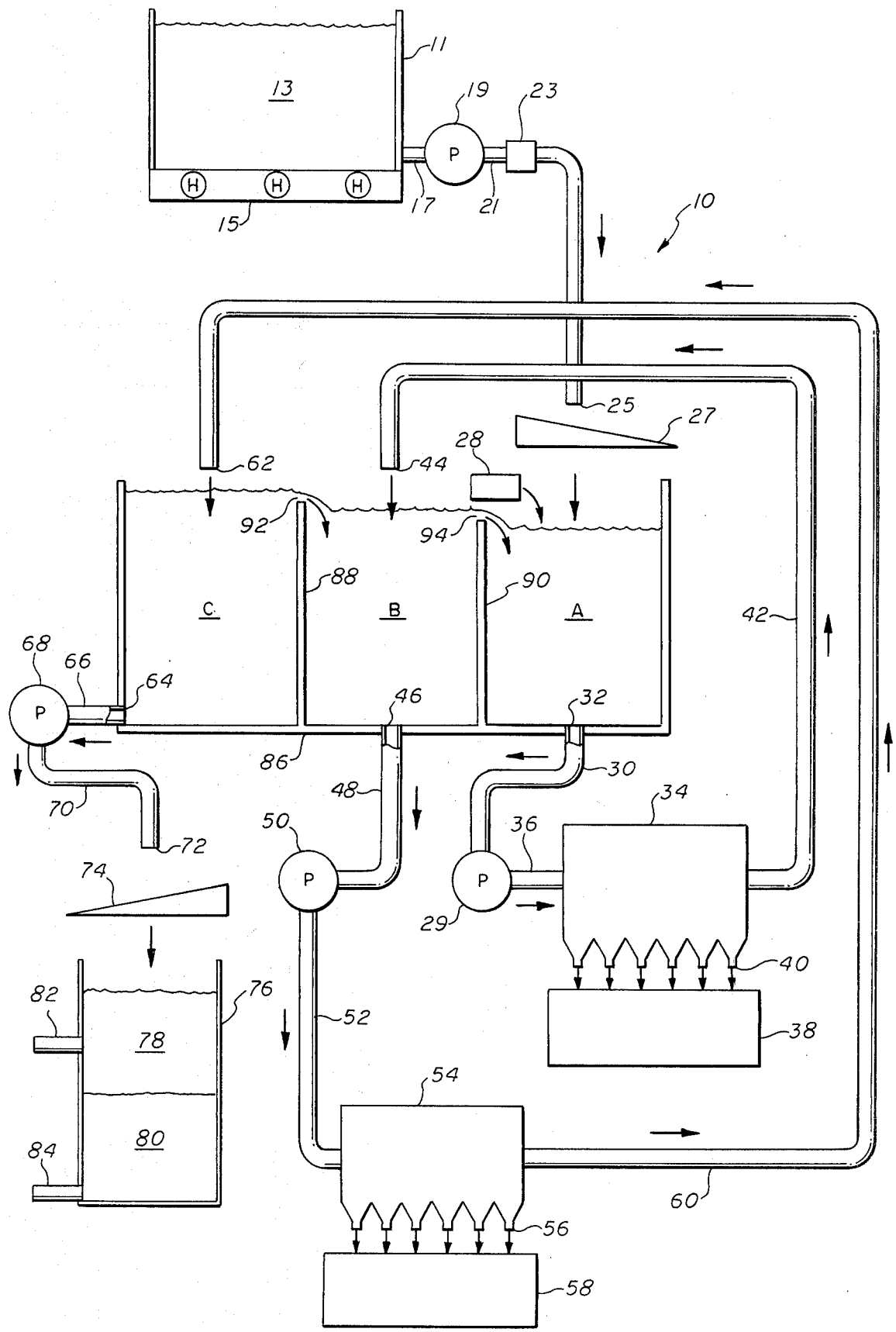

METHOD AND APPARATUS FOR RECOVERING WASTE OIL

BACKGROUND OF THE INVENTION

A. Field of the Invention

This invention relates to a method and apparatus for recovering waste oil, and more particularly to a method and apparatus for recovering oil from a mixture of oil, water, including emulsions of oil and water, and suspended solids and polymers.

B. Description of the Prior Art

During operations at refineries and petro chemical plants, spills of oil and various petroleum products are inevitable. The spilled oil and products becomes mixed with water from rainfall and other sources and eventually flow into sewers at the refinery or plant. The mixture of oil, products, and water typically includes sand, silt, rust, dust, catalyst fines and other solids. Additionally, some of the products are relatively low density polymers, which become mixed with the oil, water, and solids. The mixture also contains various emulsions of oil and water.

Because of environmental considerations and governmental regulations, the contents of the sewers at the refineries and plants may not be discharged to municipal sewer systems or to nature drainage. Rather, the sewer contents must be collected for disposal or processing by the refinery or plant operator. The refineries or plants normally have devices called interceptors that are used to separator water from oil. However, the emulsions of oil and water are difficult to break and cannot be separated in the interceptor. Also, even after processing through the interceptor, both the water and the oil are heavily contaminated with particulate matter and polymers. Accordingly, after processing in the interceptor, neither the water nor the oil are suitable for reuse or nonpolluting discharge to natural drainage.

Attempts have been made to achieve better separation of the oil and water; however, these attempts have been less than satisfactory. The attempts involve heating the mixture, adding various chemicals to the mixture, and allowing the heated chemically treated mixture to stand for a time such that the material separates by gravity into layers of oil, water, and sludge. However, the foregoing attempts have been only partially successful in breaking the emulsions. Only a relatively small portion of the emulsions are separated into oil and water. The reason for this difficulty lies apparently in the fact that the emulsions are held together by suspended particulate matter which is wetted by or has an affinity for both oil and water. Known treatment methods are ineffective in breaking such emulsions. Moreover, neither the oil nor the water after such treatment are suitable for reuse.

Accordingly, it is an object of the present invention to provide a method and apparatus for treating refinery and petrochemical wastes that overcome the shortcomings of the prior art. It is a further object of the present invention to provide a method and apparatus for treating mixtures of oil, water, and dissolved and suspended solids to yield substantially clean oil and water. It is yet a further object of the present invention to provide a method and apparatus that will break emulsions that are held together by suspended particulate matter.

SUMMARY OF THE INVENTION

Briefly stated, the foregoing and other objects and advantages are achieved by the method and apparatus of the present invention. The method includes heating the mixture of oil, water, and suspended and dissolved material to a predetermined temperature. To the heated mixture is added a de-emulsifier, which tends to break down the emulsified components of the mixture. After adding the de-emulsifier to the heated mixture, the mixture is passed through a first vibrating screen separator which removes large particles and trash and mixes thoroughly the de-emulsifer with the mixture. After the liquid has passed through the first vibrating screen, a surface tension reducer or sulfate wetting agent is added to cause rust, sulfides, and sulfate to come out of suspension more readily. The mixture is then forced through a primary hydrocyclone separator bank which removes a substantial quantity of suspended particulate matter. Additionally, the primary hydrocyclone bank tends to agglomerate suspended polymers contained within the mixture. The primary hydrocyclone bank also tends to break emulsions that form in the vicinity of suspended particulate matter. The separated solids are discharged for disposal and the liquid constituents with the agglomerated polymers and a small amount of solid matter suspended therein are further processed in a secondary hydrocyclone bank.

The secondary hydrocyclone bank removes substantially all suspended particulate matter and agglomerates substantially all of the polymers. Again, the solid matter discharged from the secondary hydrocyclone bank is collected for disposal. The liquid constituents, which are substantially clean oil and water and suspended agglomerated polymers are passed through a second vibrating screen which separates from the oil and water the agglomerated polymers. The oil and water are collected in a settling tank where, after time, the oil and water separate gravimetrically. The oil recovered by the method and apparatus of the present invention is pure enough to be blended with other oils for reuse.

BRIEF DESCRIPTION OF THE DRAWINGS

The FIGURE is a schematic diagram of the preferred embodiment of the apparatus of the present invention.

DESCRIPTION OF THE PREFERRED EMBODIMENT

Referring now to the drawing, the system of the present invention, which is designated generally by the numeral 10, is adapted to recover oil and water from the contents of sewers, and more particularly, sewers in refineries and petro chemical plants. The contents of the sewers includes a mixture of oil and water, some or all of which may be emulsified, and various suspended solids and polymers. The solids include rust, sand, silt, dust, catalyst fines, and trash, which may include leaves, cigarette butts, etc.

System 10 includes a holding tank 11, which is adapted to receive and hold the mixture 13 to be treated. In the preferred embodiment, holding tank 11 has a capacity of 30-40,000 barrels. It will of course be recognized that the capacity of holding tank 11 may be varied to suit the need of the operator. Mixture 13 in holding tank 11 is heated by means of a heater, illustrated diagrammatically at 15. Heater 15 is operable to heat mixture 13 to a temperature that enables various chemicals to be described hereinafter to accomplish effective separation of the contents of the mixture 13. In the preferred embodiment of the present invention, mixture 13 is heated to a temperature in the range of 120° F. to 140° F.

A conduit 17 is connected near the bottom of holding tank 11 for the removal of mixture 13. A pump 19 has its suction side connected to conduit 17 and its discharge side connected to a conduit 21. A first chemical injector 23 is provided to inject a de-emulsifier into mixture 13 as it flows through conduit 21. The de-emulsifier injected by chemical injector 23 serves to partially de-emulsify the water and oil phases in mixture 13. Various de-emulsifiers are well known to those skilled in the art.

The discharge 35 of conduit 21 is positioned to discharge the mixture with the de-emulsifier added thereto onto a vibrating screen 27. In the preferred embodiment, vibrating screen 27 is on the order of 20×20 mesh and is adapted to remove from the mixture large suspended particles and rash. Vibrating screen 27 also serves to intimately mix the de-emulsifier with the mixture to facilitate de-emulsification of the mixture. The mixture passing through vibrating screen 27 is collected in a catch tank A. A second chemical injector 28 is positioned to feed any of various well known surface tension reducers into catch tank A for mixing with the contents thereof. In the preferred embodiment, the surface tension reducer is a sulfate wetting agent and aids in separating sulfates, sulfides, and rust.

A pump 29 is provided having its suction connected to a conduit 30 that is connected to catch tank A at a bottom outlet opening 32. The discharge side of pump 29 is connected to a primary hydrocyclone separator bank 34 by means of a connection conduit 36. Primary hydrocyclone bank 34 includes a plurality of hydrocyclone devices connected in serial relation and adapted to separate particulate matter from the liquid being forced therethrough by pump 29. The individual hydrocyclones of primary hydrocyclone bank 34 are selected to remove particles above a certain size, which are discharged as sludge into a waste receptacle 38 through the various outlet openings 40 of the hydrocyclones of primary hydrocyclone bank 34. The separated particulate matter may be disposed of or processed further as described in allowed U.S. patent application Ser. No. 240,418, filed Mar. 4, 1981, in which the applicant of the present invention is a co-applicant.

The operation of the primary hydrocyclone bank 34 also serves to break down emulsions of oil and water in the mixture. Particulate matter of certain types tends to have an affinity for both oil and water, thus holding together the oil and water in an emulsion. The centrifugal forces that occur within primary hydrocyclone bank 34 tend to mechanically pull the solid from the liquid and oil thereby breaking the emulsion, which normally would not be broken by the methods and apparatus of the prior art.

Also, the action within primary hydrocyclone separator bank 34 tends to coalesce or agglomerate the low density polymers suspended in the water and oil. The agglomerated polymers are discharged from primary hydrocylone bank 34 along with the oil and water and a small amount of fine particulate matter.

The discharge from primary hydrocyclone bank 34 is conducted by a conduit 42 to a discharge outlet 44 positioned for discharge into a second vessel B. Second vessel B is provided with a bottom outlet opening 46 that is disposed in communication with a section conduit 48 to a pump 50. A discharge conduit 52 connected to the discharge side of pump 50 transmits liquid to a secondary hydrocyclone bank 54, which again includes a plurality of hydrocyclone devices. The hydrocyclones of secondary hydrocyclone bank 54 are selected to remove substantially all of the suspended solids which are discharged through outlets 56 into a receptacle 58, again for further processing or disposal. Again, secondary hydrocyclone bank 54 further breaks emulsions by mechanically separating small particles from the oil and water. Also, secondary hydrocyclone bank 54 further agglomerates polymer molecules.

The discharge from secondary hydrocyclone bank 54 is transported by means of a conduit 60 to a discharge opening 62 positioned to deposit oil, water and agglomerated polymers into a vessel C. Vessel C is formed to define a bottom outlet 64 that is communicated by a conduit 66 to the section side of a pump 68. The discharge side of pump 68 is connected to a conduit 70 having a discharge opening 72 positioned to discharge oil, water, and agglomerated polymers onto a second vibrating screen device 74. Vibrating screen 74, which in the preferred embodiment of the invention is on the order of 50×50 mesh, separates from the oil and water substantially all of the agglomerated polymers, which may be collected for disposal. The oil and water passing through second vibrating screen 74 is collected in a settling tank 76 where the oil 78 separates from the water 80 gravimetrically. Settling tank 76 may be provided with suitable outlets 82 and 84 for the draining of oil 78 and water 80, respectively.

In the preferred embodiment, tanks A, B, and C are included in a three compartment vessel 86. Vessel 86 includes a pair of intermediate partitions 88 and 90. Partitions 88 and 90 are of a height to form weirs 92 at 94, respectively, that are so designed that the fluid flow in system 10 is balanced. Any excess liquid within tank C will flow over weir 92 into tank B. Likewise, excess liquid in tank B will flow over weir 94 into catch tank A.

It is therefore apparent that the present invention is one well adapted to obtain all of the objects and advantages hereinabove set forth, together with other advantages which will become obvious from the foregoing description of the invention.

It will be understood that certain combinations and subcombinations are of utility and may be employed without reference to other features and subcombinations. This is contemplated by and is within the scope of the present invention.

As many possible embodiments may be made of this invention without departing from the spirit or scope hereof. It is to be understood that all matters hereinabove set forth and shown in the accompany drawing are to be interpreted as illustrative and not in any limiting sense.

What is claimed is:

1. Method of recovering oil from a mixture of oil, water, including emulsions of oil and water, and suspended solids and polymers, which comprises the steps of:

heating the mixture;

adding a de-emulsifier to the heated mixture;

passing the heated mixture with the de-emulsifier added thereto through a first vibrating screen to remove large particles and to mix thoroughly the de-emulsifier with the mixture;

adding a surface tension reducer in the heated mixture after passing said mixture through said first vibrating screen;

processing said mixture with said surface tension reducer added thereto through a hydrocyclone to remove suspended solids and to agglomerate polymers contained in said mixture;

passing said mixture after said processing step through a second vibrating screen to remove said agglomerated polymers;

and allowing said mixture passed through said second vibrating screen to settle, whereby the oil separates from the water.

2. The method as claimed in claim 1, wherein said heating step is performed in the range of 120° F. to 140° F.

3. The method of claim 1, wherein said processing step includes the steps of:

depositing said mixture in a catch basin:

withdrawing said mixture from said catch basin;

subjecting said mixture to primary hydrocyclone separation to remove most of said particulate matter from said mixture and to agglomerate a portion of said polymers;

depositing said primarily separated mixture into a receiving vessel;

withdrawing primarly separated mixture from the lower portion of said receiving vessel;

and subjecting said primarily separated mixture to secondary hydrocyclone separation to remove substantially all of said particulate matter from said mixture and to agglomerate substantially all of said polymers.

4. Apparatus for recovering oil from a mixture of oil, water, dissolved and suspended solids and dissolved polymers, which comprises:

a holding tank for collecting and holding the mixture;

means for heating the holding tank, thereby heating the mixture;

means for removing the heated mixture for the holding tank;

means for injecting into the heated mixture removed from the holding tank a de-emulsifier;

a first vibrating screen separator positioned to receive the heated mixture with the de-emulsifier added thereto to remove debris and large solid particles from said mixture;

means for receiving the mixture discharged from the first vibrating screen;

means for injecting a surface tension reducer into the mixture discharged from the first vibrating screen;

hydrocyclone means for separating solids suspended in said mixture and agglomerating polymers dissolved in said mixture to form a mixture of oil, water and suspended agglomerated polymers;

a second vibrating screen separator positioned to receive the mixture of oil, water and suspended agglomerated polymers to separate the agglomerated polymers from the oil and water;

and a settling tank positioned for receiving the oil and water discharged from the second vibrating screen and allowing the oil and water to separate from each other.

5. The apparatus as claimed in claim 4, wherein said liquid receiving means includes:

a catch tank positioned to receive the mixture discharged from said first vibrating screen.

6. The apparatus as claimed in claim 5, wherein said hydrocyclone separating means includes:

a plurality of liquid receiving vessels positioned adjacent said catch tank;

first transfer means for receiving said mixture from said catch tank;

a primary hydrocyclone bank connected to said first transfer means, said primary hydrocyclone bank including a plurality of hydrocyclones, each adapted to receive said mixture and separate therefrom a substantial quantity of said suspended solids and agglomerate a portion of said dissolved polymers;

means for transporting the liquid discharged from said primary hydrocyclone bank to a first of said plurality of liquid receiving vessels;

second transfer means for removing the liquid in said first liquid receiving vessel;

a secondary hydrocylone bank connected to said second transfer means, said secondary hydrocyclone bank including a plurality of hydrocyclones, each adapted to receive said liquid and separate therefrom substantially all of the suspended solids and agglomerate substantially all of said dissolved polymers;

means for transporting the liquid discharged from said secondary hydrocyclone bank to a second of said plurality of liquid receiving vessels;

and means for transporting the liquid in said second liquid receiving vessel to said second vibrating screen.

* * * * *